US009730239B2

United States Patent
Söder et al.

(10) Patent No.: US 9,730,239 B2
(45) Date of Patent: Aug. 8, 2017

(54) MEDIUM OR CHANNEL SENSING-BASED SCHEDULING

(71) Applicant: Telefonaktiebolaget L M Ericsson (publ), Stockholm (SE)

(72) Inventors: Johan Söder, Hägersten (SE); Filip Mestanov, Sollentuna (SE); Yu Wang, Solna (SE); Leif Wilhelmsson, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 17 days.

(21) Appl. No.: 14/432,551

(22) PCT Filed: Feb. 24, 2015

(86) PCT No.: PCT/SE2015/050208
§ 371 (c)(1),
(2) Date: Mar. 31, 2015

(87) PCT Pub. No.: WO2016/007062
PCT Pub. Date: Jan. 14, 2016

(65) Prior Publication Data
US 2016/0014796 A1    Jan. 14, 2016

Related U.S. Application Data

(60) Provisional application No. 62/023,263, filed on Jul. 11, 2014.

(51) Int. Cl.
*H04W 74/08* (2009.01)
*H04W 72/12* (2009.01)
(Continued)

(52) U.S. Cl.
CPC ....... *H04W 72/1205* (2013.01); *H04W 24/02* (2013.01); *H04W 48/12* (2013.01); *H04W 74/0808* (2013.01); *H04W 84/12* (2013.01)

(58) Field of Classification Search
CPC ............. H04W 72/1205; H04W 24/02; H04W 74/0808; H04W 48/12; H04W 84/12
See application file for complete search history.

(56) References Cited

U.S. PATENT DOCUMENTS

2007/0286122 A1\* 12/2007 Fonseca ................ H04L 1/0021
370/329
2008/0267079 A1    10/2008 Mhatre et al.
(Continued)

FOREIGN PATENT DOCUMENTS

WO    2015199593 A1    12/2015

OTHER PUBLICATIONS

Schmidt, R., et al., "Advanced Carrier Sensing to Resolve Local Channel Congestion", VANET '11 Proceedings of the Eighth ACM international workshop on Vehicular inter-networking, Sep. 23, 2011, pp. 11-20, Las Vegas, US.\*
(Continued)

*Primary Examiner* — Andrew Lai
*Assistant Examiner* — Chuong M Nguyen
(74) *Attorney, Agent, or Firm* — Coats & Bennett, PLLC

(57) ABSTRACT

There is provided a method, performed by a network node associated with at least two wireless communication devices, for scheduling packet transmission over a radio-based medium. The method comprises sensing (S1) the radio-based medium by estimating a received signal level, and evaluating (S2), for each of the at least two wireless communication devices, whether the radio-based medium is accessible or free for transmission based on comparing the received signal level to a respective threshold associated with the considered wireless communication device. The method further comprises scheduling (S3) packet transmission over the radio-based medium based on the evaluating, for each of the at least two wireless communication devices,
(Continued)

whether the radio-based medium is accessible or free for transmission.

59 Claims, 10 Drawing Sheets

(51) Int. Cl.
*H04W 24/02* (2009.01)
*H04W 48/12* (2009.01)
*H04W 84/12* (2009.01)

(56) References Cited

U.S. PATENT DOCUMENTS

| | | | | |
|---|---|---|---|---|
| 2010/0226344 A1* | 9/2010 | Nandagopalan | .... | H04W 36/385 370/338 |
| 2013/0017794 A1* | 1/2013 | Kloper | .............. | H04W 74/0808 455/63.1 |
| 2013/0195036 A1* | 8/2013 | Quan | .................... | H04W 72/04 370/329 |
| 2013/0195081 A1* | 8/2013 | Merlin | ................ | H04W 74/002 370/336 |
| 2013/0235737 A1* | 9/2013 | Merlin | .............. | H04W 74/0808 370/252 |
| 2014/0161064 A1* | 6/2014 | Jafarian | ............ | H04W 74/0816 370/329 |

OTHER PUBLICATIONS

Schmidt, R., et al., "Advanced Carrier Sensing to Resolve Local Channel Congestion", VANET '11 Proceedings of the Eighth ACM international workshop on Vehicular inter-networking, Sep. 23, 2011, pp. 11-20, Las Vegas, US, retrieved on May 26, 2015, retrieved from internet: https://www.tu-ilmenau.de/fileadmin/media/telematik/schmidt/110718_CCA-VANET.pdf.

* cited by examiner

MEDIUM OR CHANNEL SENSING-BASED SCHEDULING

TECHNICAL FIELD

The proposed technology generally relates to radio medium access and/or scheduling in a wireless communication network, and more specifically to a method for scheduling packet transmission over a radio-based medium, a method for allocating access to a radio-based medium, and corresponding arrangements, network nodes, computer programs and computer program products.

BACKGROUND

In general, medium access and/or scheduling is of outmost importance for the operation and performance of communication networks.

A contention-based protocol is a communications protocol for medium access and for operating wireless telecommunication equipment that allows many users to use the same radio-based medium with little or no pre-coordination.

Listen Before Talk, LBT, or sometimes called Listen Before Transmit is an example of a contention-based procedure for medium access used in radio communications whereby a radio transmitter first senses its radio environment, i.e. a radio based medium or channel, before it starts a transmission. Sometimes Listen Before Talk is referred to as Sense Before Transmit. The LBT operating procedure in IEEE 802.11 is one of the most well-known contention-based protocols.

For example, Carrier Sensing Multiple Access, CSMA, is a Medium Access Control, MAC, protocol in which a node verifies the absence of other traffic before transmitting on a shared transmission medium, such as an electrical bus, or a band of the electromagnetic spectrum.

Carrier Sensing means that a transmitter uses feedback from a receiver to determine whether another transmission is in progress before initiating a transmission. That is, it tries to detect the presence of a transmission or carrier wave from another station before attempting to transmit. If a transmission/carrier is sensed, the station waits for the transmission in progress to finish before initiating its own transmission. In other words, CSMA is also based on LBT. Multiple access means that multiple stations send and/or receive on the medium.

LBT is also proposed for use in cellular communication systems, such as LTE operating in unlicensed spectrum.

Reference [1] relates to a method and system for scheduling multiple concurrent transmissions during a contention access period in a wireless communications network. Communicating devices within a piconet are operable to derive a neighborhood map of the piconet. The neighborhood map information may enable a plurality of devices to concurrently transmit signals during a given channel time allocation time slot. The neighborhood map information may enable individual devices to set clear channel assessment thresholds. Individual devices may utilize threshold information to determine when to transmit signals to one or more destination devices and/or at what rate to transmit data via the signals.

Reference [2] relates to techniques to adaptively adjust a clear channel assessment threshold for use when a wireless device is to transmit in a wireless network that operates on a channel in a radio frequency band. A first wireless device, configured to wirelessly communicate with one or more second wireless device in the wireless network, receives energy on the channel in the frequency band, analyzes the received energy to detect interference on the channel and determines a type of interference detected in the received energy. The clear channel assessment threshold is adjusted by an amount depending on the type of interference detected.

Reference [3] relates to methods and corresponding systems for adapting a clear channel assessment threshold in a node in a wireless network by determining a first successful transmission rate of the node and neighboring nodes in the wireless network when the node is set to use a first threshold. Next, a second successful transmission rate of the node and the neighboring nodes is determined when the node is set to use a second threshold. Thereafter, one of the first and the second Clear Channel Assessment Thresholds, CCATs, is selected based upon the first and second successful transmission rates.

However, there is a general need to improve conventional medium access procedures such as LBT-based medium access, to provide higher system efficiency and/or better user quality.

SUMMARY

It is a general object to more optimally exploit the radio-based medium or channel, and provide efficient usage of the radio-based medium through increased access time.

It is desirable to provide an improved radio medium access scheme and/or improved scheduling in a wireless communication network.

It is an object to provide a method for scheduling packet transmission over a radio-based medium.

It is also an object to provide a method for allocating access to a radio-based medium.

It is another object to provide an arrangement for a network node associated with at least two wireless communication devices, wherein the arrangement is configured to schedule packet transmission over a radio-based medium.

It is yet another object to provide an arrangement for a network node associated with at least two wireless communication devices, wherein the arrangement is configured to allocate access to a radio-based medium.

It is also an object to provide corresponding network nodes.

Yet another object is to provide corresponding computer programs, and/or computer program products.

At least one of these and other objects is met by at least one embodiment of the proposed technology.

According to a first aspect, there is provided a method, performed by a network node associated with at least two wireless communication devices, for scheduling packet transmission over a radio-based medium, said method comprising:
  sensing the radio-based medium by estimating a received signal level;
  evaluating, for each of the at least two wireless communication devices, whether the radio-based medium is accessible or free for transmission based on comparing the received signal level to a respective threshold associated with the considered wireless communication device; and
  scheduling packet transmission over the radio-based medium based on the evaluating, for each of the at least two wireless communication devices, whether the radio-based medium is accessible or free for transmission.

According to a second aspect, there is provided a method, performed by a network node associated with at least two wireless communication devices, for allocating access to a radio-based medium, said method comprising:
  sensing the radio-based medium by estimating a received signal level;
  determining, for each of the at least two wireless communication devices, whether the radio-based medium is accessible or free for transmission based on comparing the received signal level to a respective threshold associated with the considered wireless communication device; and
  allocating access to the radio-based medium for a selected one of the wireless communication devices based on the determining, for each of the at least two wireless communication devices, whether the radio-based medium is accessible or free for transmission.

According to a third aspect, there is provided an arrangement for a network node associated with at least two wireless communication devices, wherein the arrangement is configured to schedule packet transmission over a radio-based medium. The arrangement is configured to sense the radio-based medium by estimating a received signal level. The arrangement is also configured to evaluate, for each of the at least two wireless communication devices, whether the radio-based medium is accessible or free for transmission based on comparing the received signal level to a respective threshold associated with the considered wireless communication device. The arrangement is further configured to schedule packet transmission over the radio-based medium based on the evaluation, for each of the at least two wireless communication devices, of whether the radio-based medium is accessible or free for transmission.

According to a fourth aspect, there is provided an arrangement for a network node associated with at least two wireless communication devices, wherein the arrangement is configured to allocate access to a radio-based medium. The arrangement is configured to sense the radio-based medium by estimating a received signal level. The arrangement is also configured to determine, for each of the at least two wireless communication devices, whether the radio-based medium is accessible or free for transmission based on comparing the received signal level to a respective threshold associated with the considered wireless communication device. The arrangement is further configured to allocate access to the radio-based medium for a selected one of the wireless communication devices at a time based on the determination, for each of the at least two wireless communication devices, of whether the radio-based medium is accessible or free for transmission.

According to a fifth aspect there is provided a network node comprising an arrangement according to the third aspect.

According to a sixth aspect there is provided a network node comprising an arrangement according to the fourth aspect.

According to a seventh aspect there is provided a computer program comprising instructions, which when executed by at least one processor, cause the at least one processor to:
  read information representative of an estimated received signal level obtained from sensing a radio-based medium;
  evaluate, for each of at least two wireless communication devices, whether the radio-based medium is accessible or free for transmission based on comparing the received signal level to a respective threshold associated with the considered wireless communication device; and
  schedule packet transmission over the radio-based medium based on the evaluation, for each of the at least two wireless communication devices, of whether the radio-based medium is accessible or free for transmission.

According to an eighth aspect there is provided a computer program comprising instructions, which when executed by at least one processor, cause the at least one processor to:
  read information representative of an estimated received signal level obtained from sensing a radio-based medium;
  determine, for each of at least two wireless communication devices, whether the radio-based medium is accessible or free for transmission based on comparing the received signal level to a respective threshold associated with the considered wireless communication device; and
  allocate access to the radio-based medium for a selected one of the wireless communication devices based on the determination, for each of the at least two wireless communication devices, of whether the radio-based medium is accessible or free for transmission.

According to a ninth aspect, there is provided a carrier comprising the computer program according to the seventh or eighth aspect.

According to a tenth aspect, there is provided a network node, configured to be associated with at least two wireless communication devices, for scheduling packet transmission over a radio-based medium. The network node comprises:
  a reading module for reading information representative of an estimated received signal level obtained from sensing the radio-based medium;
  an evaluation module for evaluating, for each of the at least two wireless communication devices, whether the radio-based medium is accessible or free for transmission based on comparing the received signal level to a respective threshold associated with the considered wireless communication device; and
  a scheduling module for scheduling packet transmission over the radio-based medium based on the evaluation, for each of the at least two wireless communication devices, of whether the radio-based medium is accessible or free for transmission.

According to an eleventh aspect, there is provided a network node configured to be associated with at least two wireless communication devices, for allocating access to a radio-based medium. The network node comprises:
  a reading module for reading information representative of an estimated received signal level obtained from sensing the radio-based medium;
  a determining module for determining, for each of the at least two wireless communication devices, whether the radio-based medium is accessible or free for transmission based on comparing the received signal level to a respective threshold associated with the considered wireless communication device; and
  an allocating module for allocating access to the radio-based medium for a selected one of the wireless communication devices based on the determination, for each of the at least two wireless communication devices, of whether the radio-based medium is accessible or free for transmission.

An advantage of the proposed technology is improved resource usage. The network node is enabled to take the differentiation of the wireless devices with respect to the clear channel assessment thresholds into account when allocating access to the radio-based medium and/or performing scheduling.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

Figure 1A:
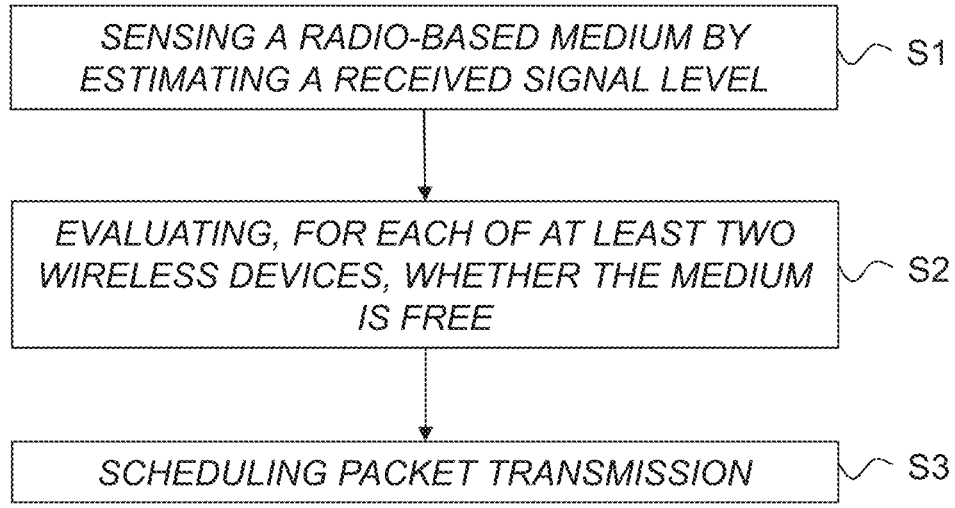
FIG. 1A is a schematic diagram illustrating an example of a method for scheduling packet transmission over a radio-based medium according to an embodiment.

FIG. 1A is a schematic diagram illustrating an example of a method for scheduling packet transmission over a radio-based medium according to an embodiment.

According to a first aspect, there is provided a method, performed by a network node associated with at least two wireless communication devices, for scheduling packet transmission over a radio-based medium. The method comprises the steps:

S1: sensing the radio-based medium by estimating a received signal level;

S2: evaluating, for each of the at least two wireless communication devices, whether the radio-based medium is accessible or free for transmission based on comparing the received signal level to a respective threshold associated with the considered wireless communication device; and S3: scheduling packet transmission over the radio-based medium based on the evaluating, for each of the at least two wireless communication devices, whether the radio-based medium is accessible or free for transmission.

In this way, medium-sensing or channel-sensing based scheduling is provided. Sensing of a radio-based medium is sometimes also referred to as channel-sensing or carrier sensing.

Step S2 can optionally be expressed as performing an evaluation, for each of the at least two wireless communication devices, of whether the radio-based medium is accessible or free for transmission based on the received signal level and a respective threshold, a so-called per-device threshold, associated with the considered wireless communication device. Step S3 of scheduling packet transmission over the radio-based medium is then performed based on the evaluation.

By way of example, each of the at least two wireless communication devices is associated with a respective individual threshold, i.e. a per-device threshold, for determining whether the radio-based medium is accessible or free for transmission.

For example, the per-device threshold may be based on device-specific information.

For example, the channel or radio-based medium may be determined to be free for transmission if the received signal level does not exceed the respective threshold.

In a particular example, the respective threshold is a clear channel assessment threshold value.

As an example, the network node may schedule packet transmission for a wireless communication device for which the medium is determined to be accessible for transmission.

Optionally, the radio-based medium is sensed during a sensing period, and access is allowed for a selected one of the wireless communication devices during a transmission period following the sensing period.

By way of example, the medium access is based on a Listen-Before-Talk, LBT, medium access procedure and the scheduling is thus performed based on some form of medium or channel sensing with individual clear channel assessment thresholds, CCATs, for the wireless devices. In other words, different wireless devices have different clear channel assessment thresholds.

For example, the network node may provide an individual clear channel assessment threshold, CCAT, for each associated wireless device, a so-called per-device CCAT.

In an example embodiment, the network node retrieves, for each of the wireless devices, the per-device CCAT from a database to effectuate CCAT configuration for that wireless device. The database may be node-internal, or located externally in relation to the network node.

As an example, the individual CCAT per-device is determined or adjusted based on device-specific information.

It should be understood that CCAT is merely an example of a threshold that can be used for channel sensing or medium sensing.

As an example, the network node may be a scheduling node, access point or radio base station.

For example, the method may be performed in a Wireless Local Area Network, WLAN, and/or a cellular communication network.

When the network is a WLAN, e.g. IEEE 802.11 WLAN, the network node may be, e.g. a WLAN Access Point, AP, or Access Controller.

It should also be noted that with respect to WLAN applications, including IEEE 802.11, the proposed technology may be applied to physical carrier sensing and/or virtual carrier sensing, keeping in mind that physical carrier sensing and virtual carrier sensing may be using different power levels to determine whether the medium is busy or idle.

When the network is a cellular network, the cellular network may be, e.g. 3GPP cellular network such as a Long Term Evolution, LTE, network configured to operate in unlicensed spectrum, and the network node may be an eNodeB.

In a specific embodiment, the network node may be regarded as a transmitting unit and the wireless communication devices may be considered as receiving units. This may for example correspond to downlink communication, when an access point or base station transmits to wireless stations or devices. In another specific embodiment, the wireless communication devices may be considered as transmitting units, corresponding to uplink communication.

In a useful example, the method may thus be performed for downlink communication, e.g. when an access point or base station intends to transmit to wireless stations or devices.

In a particular example, the evaluating step S2 is performed to determine, for each of the at least two wireless communication devices, whether the radio-based medium is accessible or free for transmission to the wireless communication device.

By way of example, access to the radio-based medium may be allocated for transmission to a selected one of the wireless communication devices based on the determining, for each of the at least two wireless communication devices, whether the radio-based medium is accessible or free for transmission.

Figure 1B:
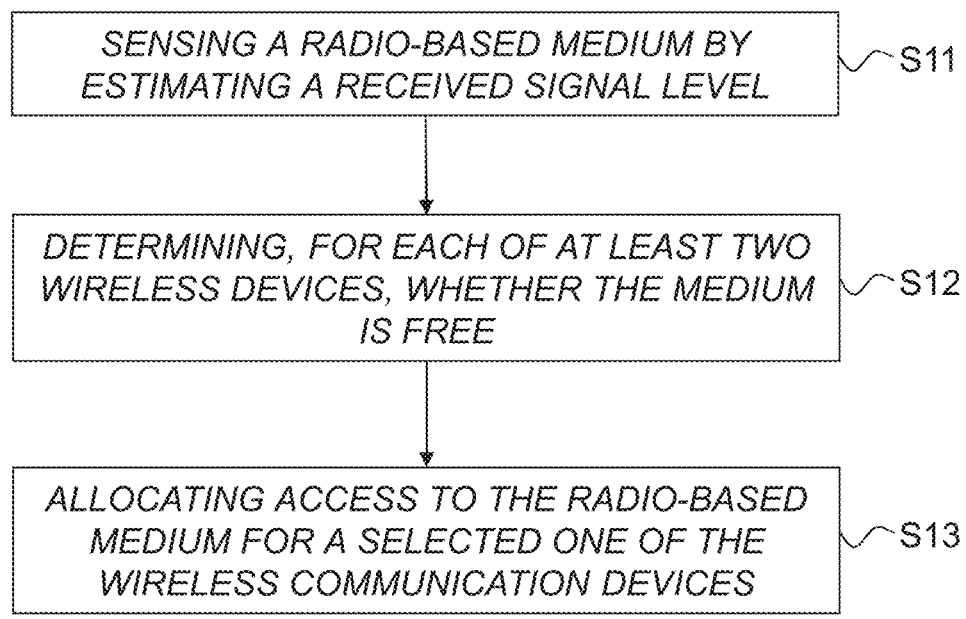
FIG. 1B is a schematic diagram illustrating an example of a method for allocating access to a radio-based medium according to an embodiment.

FIG. 1B is a schematic diagram illustrating an example of a method for allocating access to a radio-based medium according to an embodiment.

According to a second aspect, there is provided a method, performed by a network node associated with at least two wireless communication devices, for allocating access to a radio-based medium, said method comprising:
- S11: sensing the radio-based medium by estimating a received signal level;
- S12: determining, for each of the at least two wireless communication devices, whether the radio-based medium is accessible or free for transmission based on comparing the received signal level to a respective threshold associated with the considered wireless communication device; and
- S13: allocating access to the radio-based medium for a selected one of the wireless communication devices based on the determining, for each of the at least two wireless communication devices, whether the radio-based medium is accessible or free for transmission.

By way of example, each of the at least two wireless communication devices is associated with a respective individual threshold, a so-called per-device threshold, for determining whether the radio-based medium is accessible or free for transmission.

For example, the per-device threshold may be based on device-specific information.

As an example, the channel may be determined to be free for transmission if the received signal level does not exceed the respective threshold.

In a particular example, the respective threshold is a clear channel assessment threshold value.

For example, access to the radio-based medium may be allocated for transmission for a wireless communication device for which the radio-based medium has been determined to be free for transmission. In other words, the network node allocates access to the radio-based medium for a wireless device for which the radio-based medium has been determined to be free for transmission.

In a specific example embodiment, the medium may be sensed during a sensing period, and access is allowed for a selected one of the wireless communication devices during a transmission period following the sensing period.

As an example, the medium access may be based on a Listen-Before-Talk, LBT, medium access procedure. The access allocation may then be performed based on medium or channel sensing with individual clear channel assessment thresholds, CCATs, for the wireless devices. In other words, different wireless devices have different clear channel assessment thresholds.

For example, the network node may provide an individual clear channel assessment threshold, CCAT, for each associated wireless device, a so-called per-device CCAT.

In an example embodiment, the network node retrieves, for each of the wireless devices, the per-device CCAT from a database to effectuate CCAT configuration for that wireless device. The database may be node-internal, or located externally in relation to the network node.

As an example, the individual CCAT per-device may be determined or adjusted based on device-specific information.

It should be understood that CCAT is merely an example of a threshold that can be used for channel sensing or medium sensing.

By way of example, the network node may be an access point or a radio base station.

As indicated, the method may be performed in a Wireless Local Area Network and/or a cellular communication network.

For example, the network node may be a WLAN Access Point, AP, or Access Controller, when the network is a WLAN.

In another example, the network node may be an eNodeB, when the network is a 3GPP cellular network, such as a Long Term Evolution, LTE, network configured to operate in unlicensed spectrum.

In a useful example, the method may be performed for downlink communication, when an access point or base station intends to transmit to wireless stations or devices.

In a particular example, the determining step S12 is performed to determine, for each of the at least two wireless communication devices, whether the radio-based medium is accessible or free for transmission to the wireless communication device.

By way of example, access to the radio-based medium may be allocated for transmission to a selected one of the wireless communication devices based on the determining, for each of the at least two wireless communication devices, whether the radio-based medium is accessible or free for transmission.

By way of example, the proposed technology will now be described with particular reference to WLAN technology. The proposed technology is not limited thereto, but may be applied to other communication networks and scenarios, including cellular communication networks such as 3GPP networks.

Wireless Local Area Network, WLAN, such as WiFi, is standardized in the IEEE 802.11 standards (see e.g. IEEE Standard for Information technology—Telecommunications and information exchange between systems; Local and metropolitan area networks—Specific requirements; Part 11: Wireless LAN Medium Access Control (MAC) and Physical Layer (PHY) Specifications).

The IEEE 802.11 specifications regulate the STA physical layer, MAC layer and other aspects (where STA, a WLAN entity, is taken to refer to an access point—AP—and/or to a wireless terminal, also referred to as a wireless communication device or simply a device) to secure compatibility and inter-operability between the access points and devices.

WLAN is typically operated in unlicensed bands. Thus, communication over WLAN may be subject to interference sources from any number of entities (known and/or unknown).

Downlink scheduling in a WLAN system refers to the decision and action of allocating medium or channel access to one or several packets in data buffer based on some rules or algorithms in a network node such as an Access Point, AP. Downlink scheduling algorithms are proprietary and vary between different vendors so different scheduling techniques are usually employed.

The scheduling and prioritization of queued packets usually takes traffic type (voice, video, background traffic), frame types (data or control frames), queuing time and user priority (golden or bronze users) into consideration.

Figure 2:
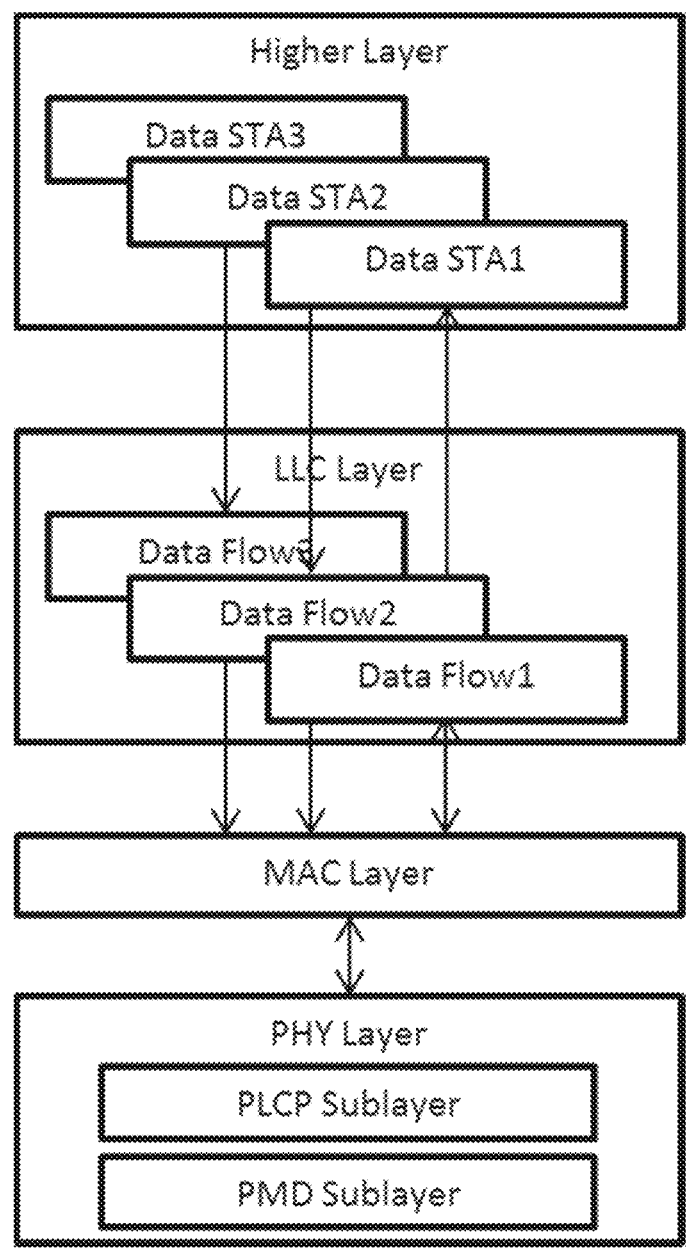
FIG. 2 is a schematic diagram illustrating an example of an overview of a WLAN system protocol stack in an Access Point, AP.

FIG. 2 is a schematic diagram illustrating an example of an overview of a WLAN system protocol stack in an Access Point, AP.

Data for multiple STAs arrives from higher layers to the LLC layer as data flows. The LLC layer in a WLAN system adopts the IEEE 802.2 standard and provides an interface between the higher layers and the 802.11 MAC layer.

The 802.11 MAC layer receives and buffers the data flows from the LLC layer as MSDUs which are encapsulated into MPDUs. It provides capabilities of fragmentation of large MSDUs over a number of MPDUs, aggregation of multiple MSDUs into A-MSDUs, aggregation of multiple MPDUs into A-MPDUs, etc. An A-MSDU and an A-MPDU may contain data to multiple destinations.

The MAC layer is also responsible for channel access acquisition, e.g. through DCF with CSMA/CA. The task of channel sensing is carried out in the PLCP sub-layer. The PMD sub-layer is responsible for the modulation and encoding of the signal.

To deal with the interference, the WLAN technology relies on Carrier Sensing Multiple Access with Collision Avoidance, CSMA/CA. Application of CSMA/CA enables sharing, effectively and fairly, of the wireless medium among different WLAN entities and possibly even among different radio access technologies, RATs.

Application of CSMA/CA in WLAN requires that every entity that intends to send data first senses the common communication channel before carrying out a data transmission. If the channel is sensed as being free, the data transmission may be carried out as planned, while the data transmission is deferred or canceled if the channel is sensed to be busy. This approach avoids or at least decreases the occurrence of duplicate transmissions (i.e. collisions, often resulting in loss of data and need for retransmissions).

Figure 3:
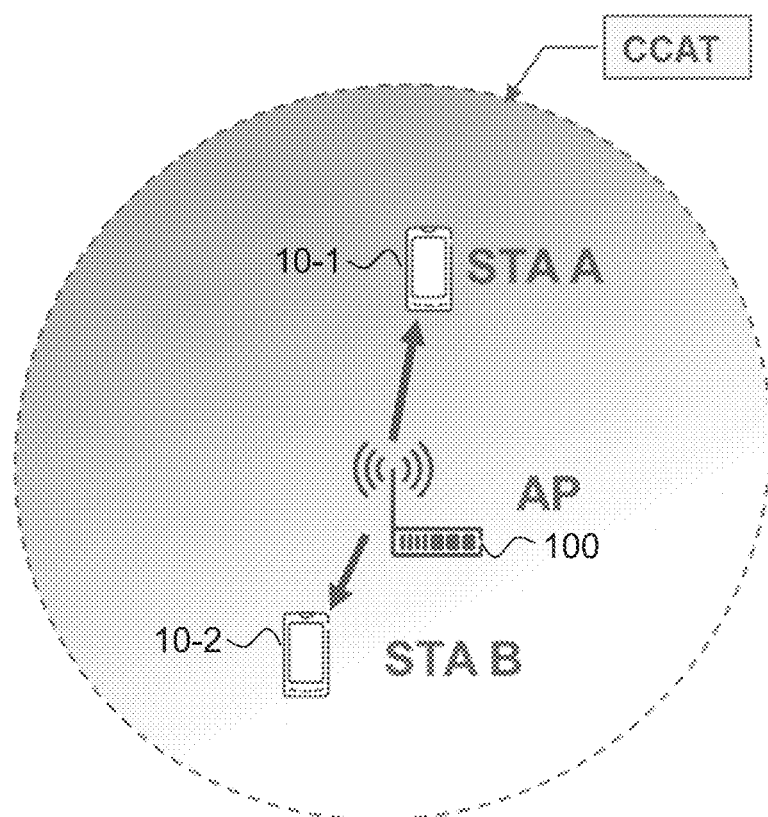
FIG. 3 is a schematic diagram illustrating an example of the concept of a CCAT threshold.

A WLAN entity (e.g. an access point) has a Clear Channel Assessment Threshold, CCAT, also referred to as the sensitivity threshold, which a received signal strength is compared to during the sensing process to determining whether the channel is busy or free. Typically, it is determined that the channel is busy if the received signal strength is larger than the threshold and it is determined that the channel is free otherwise. FIG. 3 is a schematic diagram illustrating an example of the concept of a CCAT threshold.

A network node 100 such as an AP normally uses a common CCAT when performing channel sensing for transmission to any the wireless devices 10-1, 10-2, . . . such as STAs associated to the AP.

Since the PLCP sub-layer typically performs CCA and reports the results to the MAC, the CCA threshold is normally set in the PLCP sub-layer.

Configuration of the CCAT for an access point is a tradeoff between interference avoidance and channel utilization. A low CCAT value will enlarge the sensing area, thereby avoiding concurrent transmission with other WLAN entities located in a large vicinity, which typically reduces interference as experienced by devices associated with the access point and as experienced by neighboring access points and their associated devices. However, a low CCAT also reduces the possibilities for reusing the radio channel. On the other hand, a high CCAT value will result in a smaller sensing area, thereby enabling a larger extent of radio channel reuse while increasing the probability of collision. Thus, disadvantages will typically be experienced regardless of the CCAT value.

It should also be noted that even though carrier sensing multiple access with collision avoidance, CSMA/CA, is used herein as an illustrative example of a listen-before-talk method, the various embodiments may be equally applicable to any wireless communication with application of a listen-before-talk (or, equivalently, sense-before-transmit) principle. Furthermore, the use of the notation clear channel assessment threshold is meant to comprise (and not exclude) any threshold with the same purpose but potentially different naming in any wireless communication with application of a listen-before-talk or equivalent principle of medium access.

By way of example, a network node such as an access point may be adapted to operate in association with a communication standard with application of a sense-before-transmit or listen-before-talk principle and adapted to communicate with one or more wireless communication devices associated with the access point.

In a particular example, for each of the one or more wireless communication devices, a respective clear channel assessment threshold value is maintained for the wireless communication device based on one or more parameters of the wireless communication device (thus, maintaining a respective clear channel assessment threshold value for each of the wireless communication device based on one or more parameters of each wireless communication device), wherein the respective clear channel assessment threshold value is for application in channel sensing related to an intended transmission to the wireless communication device.

The one or more parameters of the wireless communication device may, for example, comprise one or more of:
  a received signal strength (or power or similar) of a signal transmitted from the access point as received by the wireless communication device;
  a received signal strength (or power or similar) of a signal transmitted from the wireless communication device as received by the access point;
  an indication of a geographical location of the wireless communication device;
  an indication of a geographical location of an interferer;
  a target throughput to the wireless communication device; and
  a quality (e.g. bit error rate, packet error rate, or similar) of a communication link between the access point and the wireless communication device.

A geographical location may be defined as a geographical point (e.g. having specific geographical coordinates) and/or as a geographical area (including an ensemble of geographical points). Geographical coordinates may, for example, comprise a distance to the access point from the wireless communication device (or interferer) and/or an angle at which the access point sees the wireless communication device (or interferer).

In some embodiments, the respective clear channel assessment threshold value is determined as a maximum of:
   a lowest possible threshold value; and
   a received signal strength minus a margin value.

The margin value may, according to some embodiments, be set to a first value if an interferer is indicated to be in a first geographical location and to a second value if the interferer is indicated to be in a second geographical location, wherein the first value is larger than the second value and the first geographical location is closer to a geographical location of the wireless communication device than the second geographical location is.

In some embodiments, the respective clear channel assessment threshold value may be increased if a measured throughput is higher than a target throughput and the respective clear channel assessment threshold value may be decreased if the measured throughput is lower than the target throughput.

The maintaining of the respective clear channel assessment threshold value may comprise initializing the respective clear channel assessment threshold value to a default value when the wireless communicating device is associated with the access point according to some embodiments.

In some embodiments, the maintaining of the respective clear channel assessment threshold value may comprise receiving a parameter report indicative of at least one of the one or more parameters from the wireless communication device, and updating the respective clear channel assessment threshold value based on the received parameter report.

In some embodiments, the maintaining of the respective clear channel assessment threshold value may further comprise transmitting a parameter request to the wireless communication device to trigger the parameter report.

In some embodiments, the maintaining of the respective clear channel assessment threshold value may comprise storing the respective clear channel assessment threshold value in a threshold database.

The sensing of the channel based on the maintained respective clear channel assessment threshold value may, in some embodiments, comprise comparing a received signal level to the maintained respective clear channel assessment threshold value, and determining the channel to be free for transmission if the received signal level does not exceed the maintained respective clear channel assessment threshold value.

In a particular example, it is thus assumed that the network node such as an AP has a separate CCAT for each associated wireless device such as a STA.

The proposed technology will now mainly be described with reference to APs, STAs and CCATs, but the proposed technology is of course not limited thereto.

For example, the individual CCAT per STA may be adjusted dynamically based on STA-specific information in order to optimize user throughput and system efficiency.

In other words, the proposed technology may apply a separate CCAT for each associated STA. An additional step, i.e. CCAT configuration, in a channel sensing entity is introduced to query the per-STA CCAT from a database and apply it for channel sensing.

Figure 4:
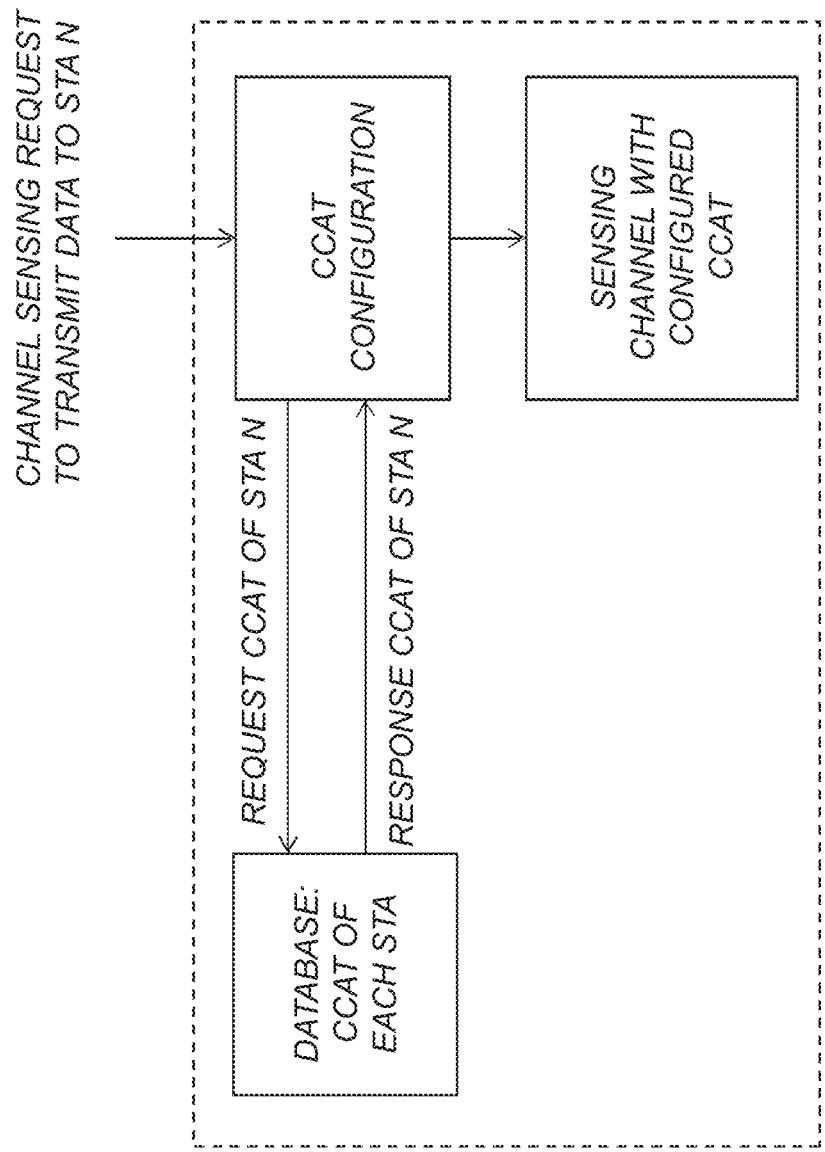
FIG. 4 is a schematic diagram illustrating an example of how the per-STA CCAT is configured and applied.

FIG. 4 is a schematic diagram illustrating an example of how the per-STA CCAT is configured and applied.

In this example, the per-STA CCAT is maintained and stored in a database. When a channel sensing request is passed to the sensing entity which is normally a part of the PLCP sub-layer, the sensing request may be accompanied with an identity of the STA intended for the data to transmit, i.e. STA N. Then the CCAT configuration component may send a request to the database hosting the per-STA CCAT information and receive a response. The queried CCAT for the STA is then applied to decide if the channel is busy.

More generally, the network node for example retrieves, for each of the considered wireless devices, the respective threshold by sending a request including information representing the identity of the wireless device to a database holding per-device thresholds and receiving a response including the corresponding threshold. The database may be node-internal, or located externally in relation to the network node. Depending on different types of information needed for the dynamic adjustment, several mechanisms may be applied for information exchange, such as:
   The AP continuously monitors some parameters of the STA.
   The AP requests a report from the STA.
   The AP sets a trigger condition in the STA, and the STA sends a report to the AP upon the fulfillment of the condition.

The use of a per-STA CCAT has proved beneficial to improve system efficiency and user throughput. The different values of CCAT for different STAs imply that the transmission opportunity of data to different STAs is different given the same level of environment interference level sensed at the AP.

Figure 5:
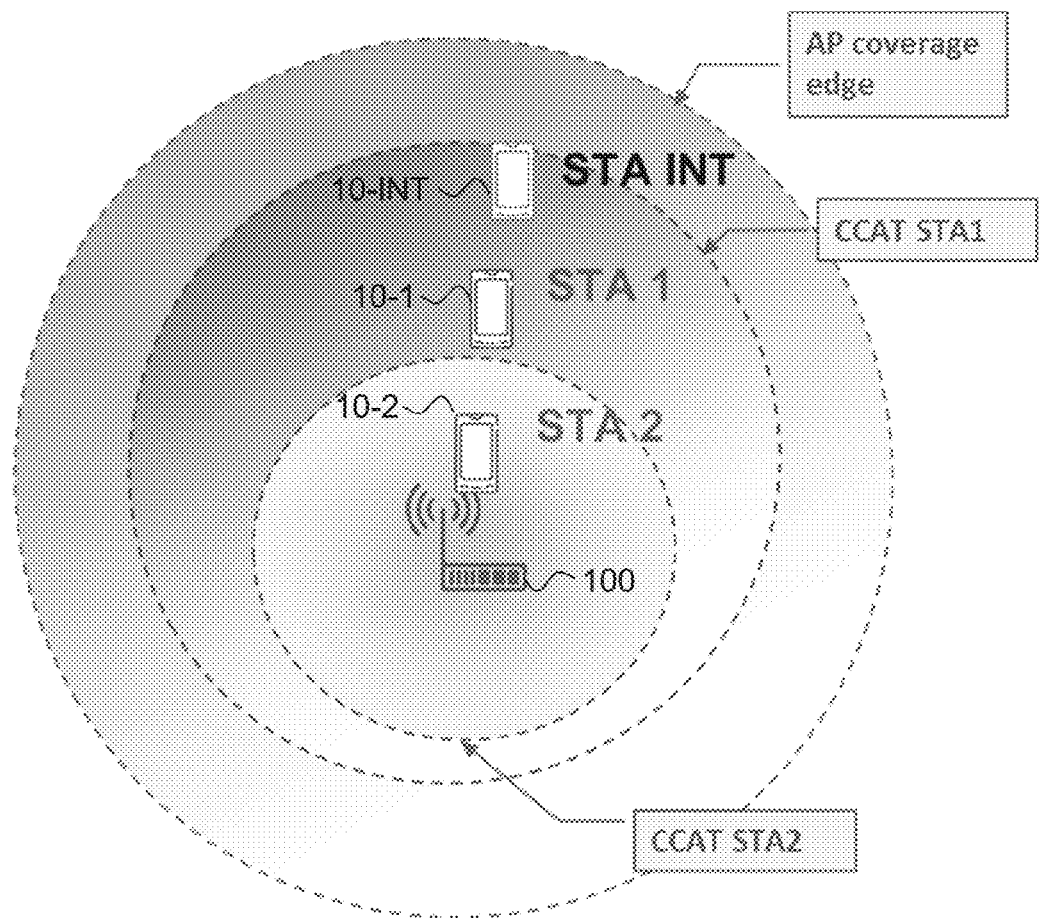
FIG. 5 is a schematic diagram illustrating an example of a communication scenario involving different mobile stations with different CCAT thresholds.

For example, a network node 100 such as an AP may have data in buffer towards two wireless devices 10-1, 10-2 such as STAs and CCAT STA1<CCAT STA 2 as shown in FIG. 5. Meanwhile, the sensed interference level ($P_{INT}$) (coming from a STA, STA INT, which does not belong to the population of this particular AP, but is connected to another AP) is between the two CCATs, i.e. CCAT STA1<$P_{INT}$<CCAT STA2.

In this case, when an interfering wireless device 10-INT such as STA INT is transmitting the AP will consider the channel as busy when transmitting to STA1 10-1 and as free when transmitting to STA2 10-2. If STA1 is scheduled the channel access time will be wasted and yields to lower system efficiency and user service quality.

When an AP has data in buffer to be transmitted to multiple STAs in a WLAN system, the scheduling of the data usually does not take lower layer information into account and results in sub-optimal system efficiency.

According to a particular non-limiting example, there is provided a method that enhances the scheduling in a WLAN system in order to take consideration of the fact that different STAs might have different CCATs. A network node such as an AP analyzes the current radio environment, evaluates the CCATs that different STAs have and schedules packet transmissions to STAs that have access to the radio channel.

The method may be applied to other contention-based systems as well, and WLAN is here merely used as an example.

By way of example, the proposed technology provides a method that enhances the scheduling in a communication network such as a WLAN system to increase radio channel access opportunity. The method may be implemented in a network node such as a WLAN device, e.g. an AP. WLAN and AP are used as examples and the method may be applied to other systems and devices as well, as already indicated.

In a WLAN system, for example, a CCAT is applied to identify if the radio channel is busy and accessible for data transmission as described earlier. The CCAT in an AP may be different towards different communication peers.

As seen in FIG. 5, the CCAT towards STA2 is configured to a higher value than the one of STA1 since STA2 is closer the AP and the transmission from the AP to STA2 may be successful even when the STA INT is transmitting at the same time. On the other hand, the CCAT towards STA1 has to be set to a lower value and no transmission from the AP to STA1 is possible when INT is transmitting.

In this simplified scenario, we can consider that the AP has a transmission buffer, filled with packets for both STA 1 and STA 2. "S1 P1" denotes the first packet to be transmitted to STA1.

The status of STA INT is assumed as shown in the table below:

|  | Time | | | |
| --- | --- | --- | --- | --- |
|  | t1-t2 | t2-t3 | t3-t4 | t4-t5 |
| STA INT state | Active | Active | Inactive | Inactive |

When the STA INT is active, i.e. transmitting, only the transmission from the AP to STA2 has access to the radio channel. When the STA INT is inactive, i.e. no ongoing transmission, the AP can transmit to either STA1 or STA2.

Figure 6:
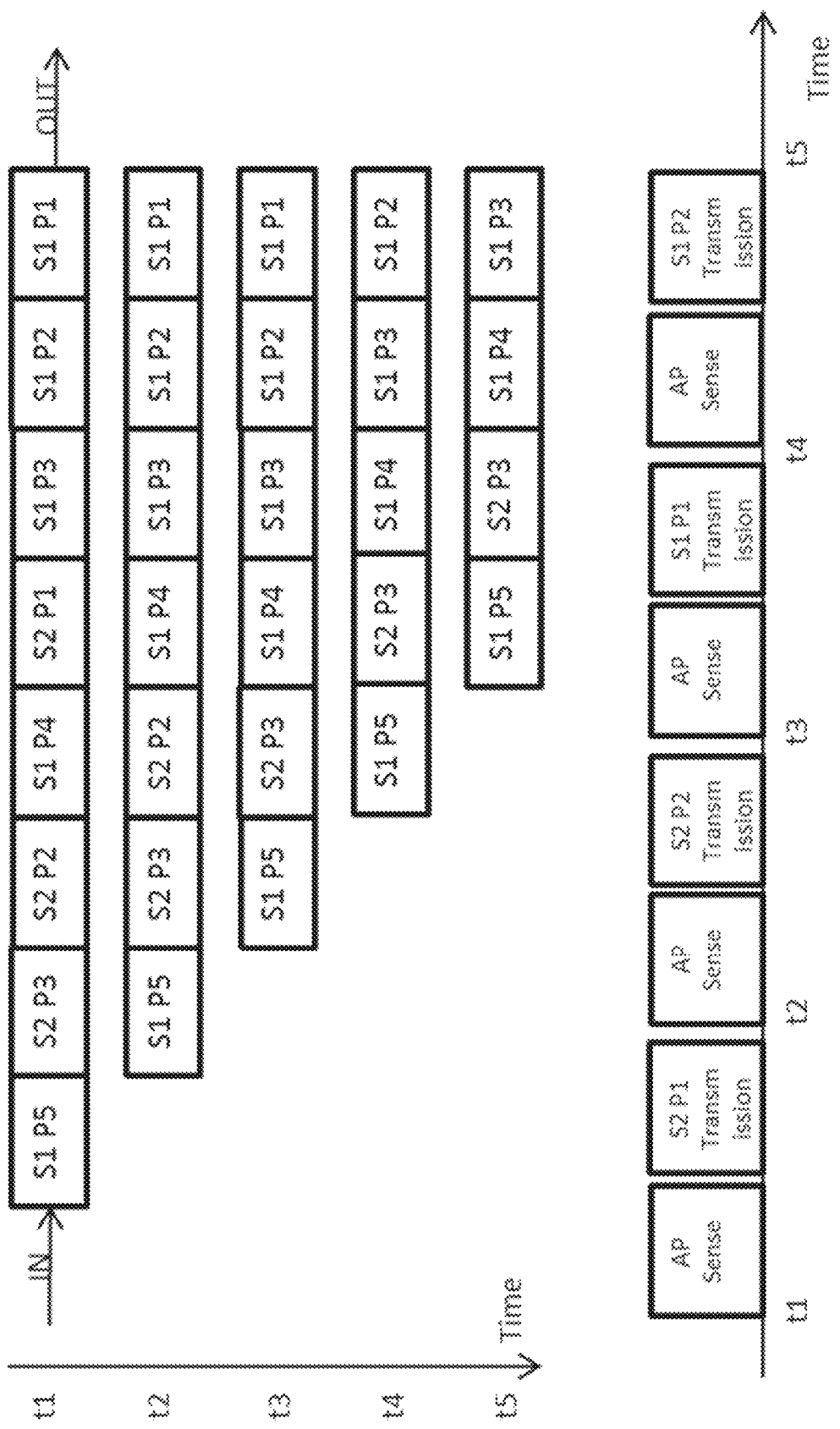
FIG. 6 is a schematic diagram illustrating an example of the buffer state and transmission state of an AP.

The buffer state and transmission state of the AP are shown in the non-limiting example of FIG. 6.

Before transmitting the AP will sense the channel. At t1, the AP senses the transmission from the STA INT and selects the first packet of STA2, i.e. S2 P1, in the buffer to transmit since the transmission to STA1 does not have channel access. Similarly, S2 P2 is selected at t2 for transmission since the STA INT is still active. At t3, the AP senses the STA INT is inactive, i.e. no interference from the STA INT, the AP may send a packet from either STA1 or STA2. Since the oldest packet in the buffer is S1 P1, this packet is transmitted. Again, at t4 the oldest packet in the buffer, S1 P2, is transmitted when transmission towards both STAs has channel access.

Without the proposed technology, the oldest packet in the buffer will normally be transmitted. Since the STA INT is active from t1 to t3, the AP will have to back off the transmission towards STA1 until the STA INT becomes inactive. In this case, the channel time between t1 and t3 is wasted.

At least one embodiment provides significant benefits over the legacy case in terms of radio resource usage. While in the legacy solutions such as legacy CSMA-CA transmissions time is "wasted" in back-off procedures when the channel is found busy, in this case the network node such as an AP can take advantage of the differentiation between different STAs in order to maximize the air usage by scheduling packets to STAs that have favorable radio conditions and actually may access the medium in the considered time period.

The proposed technology may be used as an add-on in relation to a pre-scheduling mechanism using any scheduling prioritization including first-in-first-out or on its own as the main scheduling mechanism.

As used herein, the non-limiting terms "wireless communication device" may refer to User Equipment, a mobile station, a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a target device, a device to device UE, a machine type UE or UE capable of machine to machine communication, iPAD, customer premises equipment, CPE, laptop embedded equipment, LEE, laptop mounted equipment, LME, USB dongle, a portable electronic radio communication device, a sensor device equipped with radio communication capabilities or the like. In particular, the term "UE" and the term "wireless device" should be interpreted as non-limiting terms comprising any type of wireless device communicating with a radio network node in a cellular or mobile communication system or any device equipped with radio circuitry for wireless communication according to any relevant standard for communication within a cellular or mobile communication system.

As used herein, the non-limiting term "network node" may refer to base stations, network control nodes such as network controllers, radio network controllers, base station controllers, scheduling nodes and the like. In particular, the term "base station" may encompass different types of radio base stations including standardized base stations such as Node Bs, or evolved Node Bs, eNBs, and also macro/micro/pico radio base stations, home base stations, also known as femto base stations, relay nodes, repeaters, radio access points, base transceiver stations, BTSs, and even radio control nodes controlling one or more Remote Radio Units, RRUs, or the like.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to a third aspect, there is provided an arrangement for a network node associated with at least two wireless communication devices, wherein the arrangement is configured to schedule packet transmission over a radio-based medium. The arrangement is configured to sense the radio-based medium by estimating a received signal level. The arrangement is also configured to evaluate, for each of the at least two wireless communication devices, whether the radio-based medium is accessible or free for transmission based on comparing the received signal level to a respective threshold associated with the considered wireless communication device. The arrangement is further configured to schedule packet transmission over the radio-based medium based on the evaluation, for each of the at least two wireless communication devices, of whether the radio-based medium is accessible or free for transmission.

According to a fourth aspect, there is provided an arrangement for a network node associated with at least two wireless communication devices, wherein the arrangement is configured to allocate access to a radio-based medium. The arrangement is configured to sense the radio-based medium by estimating a received signal level. The arrangement is also configured to determine, for each of the at least two wireless communication devices, whether the radio-based medium is accessible or free for transmission based on comparing the received signal level to a respective threshold associated with the considered wireless communication device. The arrangement is further configured to allocate access to the radio-based medium for a selected one of the wireless communication devices at a time based on the determination, for each of the at least two wireless communication devices, of whether the radio-based medium is accessible or free for transmission.

By way of example, each of the at least two wireless communication devices is associated with a respective individual threshold for determining whether the radio-based medium is accessible or free for transmission.

For example, the respective threshold is a per-device threshold that is based on device-specific information.

In a particular example, the arrangement is configured to perform medium access based on a Listen-Before-Talk, LBT, medium access procedure, and configured to perform scheduling or access allocation based on medium or channel sensing with individual clear channel assessment thresholds, CCATs, for the wireless devices.

Optionally, the arrangement may be configured to operate in connection with a database maintaining an individual clear channel assessment threshold, CCAT, for each associated wireless device, a so-called per-device CCAT. Reference can be made, e.g. to FIG. 4.

As an example, the arrangement may be configured to retrieve, for each of the wireless devices, the per-device CCAT from the database to effectuate CCAT configuration for the wireless device.

In an optional embodiment, the arrangement is configured to determine or adjust the individual CCAT per-device based on device-specific information.

More generally, the arrangement may for example be configured to send, for each of the wireless devices, a corresponding request to a database holding per-device thresholds and receive a response including the respective threshold.

In a particular example, the arrangement is configured to evaluate or determine, for each of the at least two wireless communication devices, whether the radio-based medium is accessible or free for transmission to the wireless communication device.

By way of example, the arrangement may be configured to allocate access to the radio-based medium for transmission to a selected one of the wireless communication devices.

According to a fifth aspect there is provided a network node comprising an arrangement according to the third aspect.

According to a sixth aspect there is provided a network node comprising an arrangement according to the fourth aspect.

By way of example, the network node may be a scheduling node, access point or radio base station.

Figure 7:
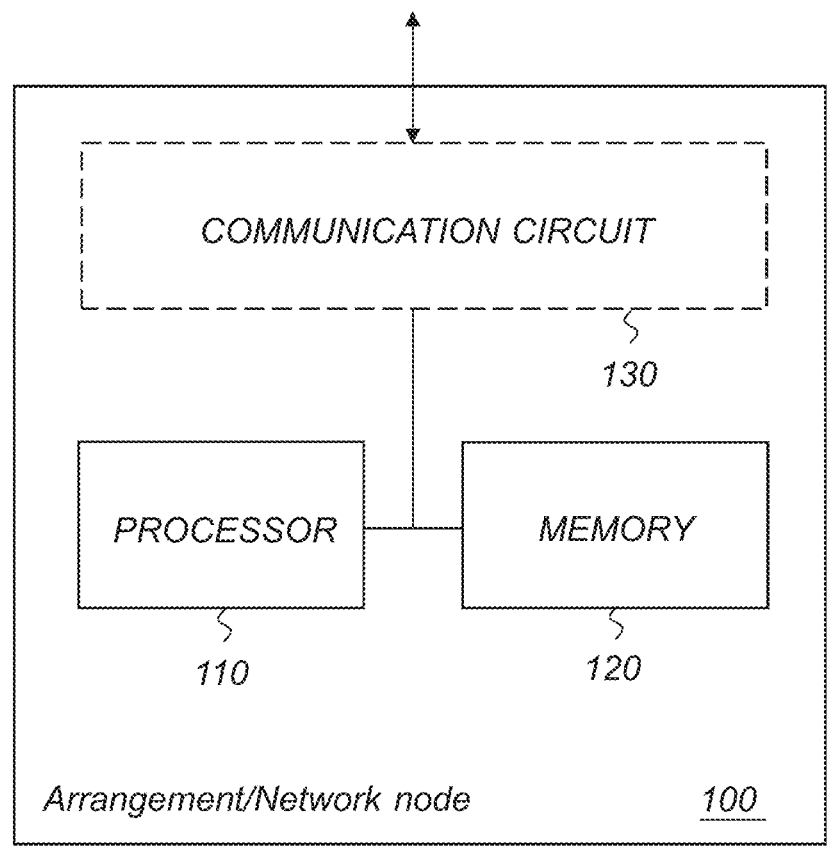
FIG. 7 is a schematic block diagram illustrating an example of an arrangement and/or network node comprising a processor and an associated memory.

FIG. 7 is a schematic block diagram illustrating an example of an arrangement and/or network node 100 comprising a processor 110 and an associated memory 120.

In a particular example, the arrangements and/or network nodes include a processor 110 and a memory 120, where the memory 120 comprises instructions executable by the processor, whereby the apparatus/processor is operative to perform the described functions, steps, and/or actions. More specifically, the memory 120 comprises instructions executable by the processor 110, whereby the processor 110 is operative to schedule packet transmission or allocate access to the radio-based medium.

In this particular example, at least some of the steps, functions, procedures, modules and/or blocks described herein are implemented in a computer program, which is loaded into the memory 120 for execution by processing circuitry including one or more processors 110. The processor(s) 110 and memory 120 are interconnected to each other to enable normal software execution. An optional input/output device may also be interconnected to the processor(s) and/or the memory to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

The memory 120 may also store data, e.g. organized in one or more data buffers or databases. For example, the above-mentioned database for holding per-device thresholds may be implemented in the memory 120.

Optionally, the wireless communication devices and/or network nodes may include a communication circuit 130. The communication circuit 130 may include functions for wired and/or wireless communication with other devices and/or network nodes in the network. In a particular example, the wireless device, UE, network node may include radio circuitry for communication with one or more other nodes, including transmitting and/or receiving information. The communication circuit 130 may be interconnected to the processor 110 and/or memory 120.

Figure 8:
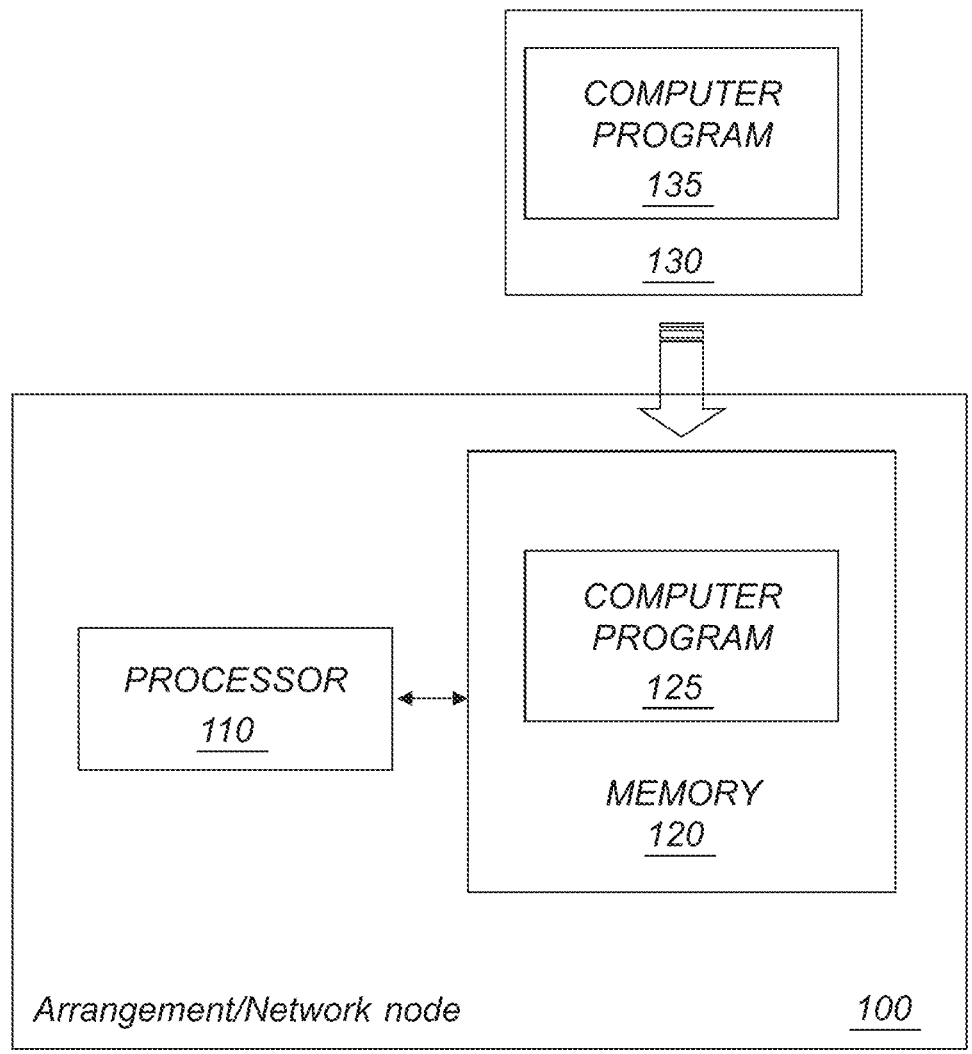
FIG. 8 is schematic block diagram illustrating another example of an arrangement and/or network node comprising a processor and an associated memory including a computer program and computer program product.

FIG. 8 is schematic block diagram illustrating another example of an arrangement and/or network node comprising a processor and an associated memory including a computer program and computer program product.

According to a seventh aspect there is provided a computer program 125; 135 comprising instructions, which when executed by at least one processor 110, cause the at least one processor 110 to:

read information representative of an estimated received signal level obtained from sensing a radio-based medium;

evaluate, for each of at least two wireless communication devices, whether the radio-based medium is accessible or free for transmission based on comparing the received signal level to a respective threshold associated with the considered wireless communication device; and schedule packet transmission over the radio-based medium based on the evaluation, for each of the at least two wireless communication devices, of whether the radio-based medium is accessible or free for transmission.

According to an eighth aspect there is provided a computer program 125; 135 comprising instructions, which when executed by at least one processor 110, cause the at least one processor 110 to:

read information representative of an estimated received signal level obtained from sensing a radio-based medium;

determine, for each of at least two wireless communication devices, whether the radio-based medium is accessible or free for transmission based on comparing the received signal level to a respective threshold associated with the considered wireless communication device; and allocate access to the radio-based medium for a selected one of the wireless communication devices based on the determination, for each of the at least two wireless communication devices, of whether the radio-based medium is accessible or free for transmission.

According to a ninth aspect, there is also provided a carrier 120; 130 comprising the computer program 125; 135 according to the seventh or eighth aspect.

The proposed technology thus provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 125; 135 may be realized as a computer program product, which is normally carried or stored on a computer-readable medium 120; 130, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory 120 of a computer or equivalent processing device for execution by the processing circuitry 110 thereof. Reference can be made to the example of FIG. 8.

The flow diagram or diagrams presented herein may therefore be regarded as a computer flow diagram or diagrams, when performed by one or more processors. A corresponding arrangement and/or network node may be defined as a group of function modules, where each step performed by the processor corresponds to a function module. In this case, the function modules are implemented as a computer program running on the processor. Hence, the arrangement and/or network node may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein.

Figure 9:
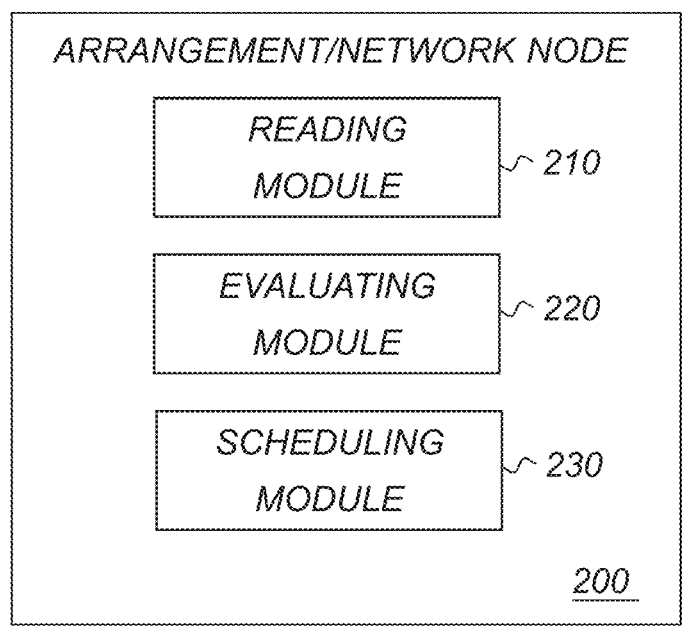
FIG. 9 is a schematic block diagram illustrating an example of an arrangement and/or network node comprising a group of function modules.

FIG. 9 is a schematic block diagram illustrating an example of an arrangement and/or network node comprising a group of function modules.

According to a tenth aspect, there is provided a network node and/or arrangement 200, configured to be associated with at least two wireless communication devices, for scheduling packet transmission over a radio-based medium. The network node 200 comprises:

a reading module 210 for reading information representative of an estimated received signal level obtained from sensing the radio-based medium;

an evaluation module 220 for evaluating, for each of the at least two wireless communication devices, whether the radio-based medium is accessible or free for transmission based on comparing the received signal level to a respective threshold associated with the considered wireless communication device; and a scheduling module 230 for scheduling packet transmission over the radio-based medium based on the evaluation, for each of the at least two wireless communication devices, of whether the radio-based medium is accessible or free for transmission.

Figure 10:
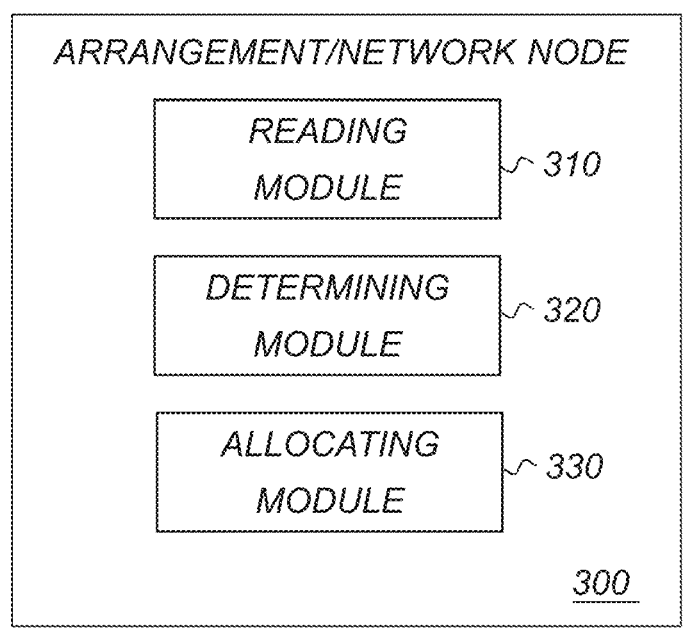
FIG. 10 is a schematic block diagram illustrating an example of another arrangement and/or network node comprising a group of function modules.

FIG. 10 is a schematic block diagram illustrating an example of another arrangement and/or network node comprising a group of function modules.

According to an eleventh aspect, there is provided a network node and/or arrangement 300, configured to be associated with at least two wireless communication devices, for allocating access to a radio-based medium. The network node 300 comprises:

a reading module 310 for reading information representative of an estimated received signal level obtained from sensing the radio-based medium;

a determining module 320 for determining, for each of the at least two wireless communication devices, whether the radio-based medium is accessible or free for transmission based on comparing the received signal level to a respective threshold associated with the considered wireless communication device; and an allocating module 330 for allocating access to the radio-based medium for a selected one of the wireless communication devices based on the determination, for each of the at least two wireless communication devices, of whether the radio-based medium is accessible or free for transmission.

Alternatively it is possibly to realize the modules in FIG. 9 or 10 predominantly by hardware modules, or alternatively by hardware. The extent of software versus hardware is purely implementation selection.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

ABBREVIATIONS

WLAN Wireless Local Area Network
AP Access Point
STA Station
LBT Listen-Before-Talk
LTE Long Term Evolution
LLC Logic Link Control
MAC Medium Access Control
PHY Physical
PMD Physical Medium Dependent
PLCP Physical Layer Convergence Protocol
MSDU MAC Service Data Unit
MPDU MAC Protocol Data Unit
A-MSDU Aggregated MSDU
A-MPDU Aggregated MPDU
DCF Distributed Coordination Function
CSMA/CA Carrier Sense Multiple Access/Collision Avoidance
CCAT Clear Channel Assessment Threshold

REFERENCES

[1] US 2010/226344
[2] US 2013/017794
[3] US 2007/286122

The invention claimed is:

1. A method, performed by a network node associated with at least two wireless communication devices, for scheduling packet transmission over a radio-based medium, said method comprising:
   sensing the radio-based medium by estimating a received signal level;
   evaluating, for each of the at least two wireless communication devices, whether the radio-based medium is accessible or free for transmission based on comparing the received signal level to a respective threshold associated with the evaluated wireless communication device; and
   scheduling packet transmission over the radio-based medium based on the evaluating, for each of the at least two wireless communication devices, whether the radio-based medium is accessible or free for transmission,
   wherein the network node schedules packet transmission for at least one of the evaluated wireless communication devices, for which the radio-based medium is determined to be accessible or free for transmission.

2. The method of claim 1, wherein each of the at least two wireless communication devices is associated with a respective individual threshold for determining whether the radio-based medium is accessible or free for transmission.

3. The method of claim 1, wherein each of the respective thresholds is a per-device threshold that is based on device-specific information.

4. The method of claim 1, wherein the radio-based medium is determined to be free for transmission if the received signal level does not exceed the respective threshold.

5. The method of claim 1, wherein each of the respective thresholds is a clear channel assessment threshold value.

6. The method of claim 1, wherein the network node allocates access to the radio-based medium for at least one of the evaluated wireless communication devices, for which the radio-based medium has been determined to be free for transmission.

7. The method of claim 1, wherein the radio-based medium is sensed during a sensing period, and access is allowed for a selected one of the evaluated wireless communication devices during a transmission period following the sensing period.

8. The method of claim 1, wherein access to the radio-based medium is based on a Listen-Before-Talk (LBT) medium access procedure, and the scheduling is performed based on radio-based medium or channel sensing with individual ones of clear channel assessment thresholds (CCATs) for each of the at least two wireless communication devices.

9. The method of claim 8, wherein the network node provides an individual clear channel assessment threshold (CCAT) for each associated wireless communication device, a so-called per-device CCAT.

10. The method of claim 9, wherein the network node retrieves, for each of the at least two wireless communication devices, the per-device CCAT from a database to effectuate CCAT configuration for the evaluated wireless communication device.

11. The method of claim 9, wherein the individual CCAT per-device is determined or adjusted based on device-specific information.

12. The method of claim 1, wherein the network node is a scheduling node, an access point or a radio base station.

13. The method of claim 1, wherein the method is performed in a Wireless Local Area Network (WLAN) and/or a cellular communication network.

14. The method of claim 1, wherein the method is performed for downlink communication.

15. The method of claim 1, wherein the network node retrieves, for each of the at least two wireless communication devices, the respective threshold by sending a request including information representing an identity of the evaluated wireless communication device to a database holding per-device thresholds and receiving a response including the corresponding threshold.

16. The method of claim 1, wherein the evaluating is performed to determine, for each of the at least two wireless communication devices, whether the radio-based medium is accessible or free for transmission to the evaluated wireless communication device.

17. The method of claim 1, wherein access to the radio-based medium is allocated for packet transmission to a selected one of the evaluated wireless communication devices based on the evaluating, for each of the at least two wireless communication devices, whether the radio-based medium is accessible or free for transmission.

18. Circuitry associated with at least two wireless communication devices, wherein the circuitry is configured to schedule packet transmission over a radio-based medium, the circuity comprising:
   a processor and a memory, said memory containing instructions executable by said processor whereby said circuitry is configured to:
   sense the radio-based medium by estimating a received signal level;
   evaluate, for each of the at least two wireless communication devices, whether the radio-based medium is accessible or free for transmission based on comparing the received signal level to a respective threshold associated with the evaluated wireless communication device; and
   schedule packet transmission over the radio-based medium based on the evaluation, for each of the at least two wireless communication devices, of whether the radio-based medium is accessible or free for transmission, wherein the circuitry is configured to schedule the packet transmission for at least one of the evaluated wireless communication devices, for which the radio-based medium is determined to be accessible or free for transmission.

19. The circuitry of claim 18, wherein each of the at least two wireless communication devices is associated with a respective individual threshold for determining whether the radio-based medium is accessible or free for transmission.

20. The circuitry of claim 18, wherein each of the respective thresholds is a per-device threshold that is based on device-specific information.

21. The circuitry of claim 18, wherein said memory contains instructions executable by said processor whereby the circuitry is configured to perform radio-based medium access based on a Listen-Before-Talk (LBT) medium access procedure, and configured to perform scheduling or access allocation based on radio-based medium or channel sensing with individual ones of clear channel assessment thresholds (CCATs) for each of the at least two wireless communication devices.

22. The circuitry of claim 18, wherein said memory contains instructions executable by said processor whereby the circuitry is configured to operate in connection with a database maintaining an individual clear channel assessment threshold (CCAT) for each associated wireless communication device, a so-called per-device CCAT.

23. The circuitry of claim 22, wherein said memory contains instructions executable by said processor whereby the circuitry is further configured to retrieve, for each of the at least two wireless communication devices, the per-device CCAT from the database to effectuate CCAT configuration for the evaluated wireless communication device.

24. The circuitry of claim 22, wherein said memory contains instructions executable by said processor whereby the circuitry is further configured to determine or adjust the individual CCAT per device based on device-specific information.

25. The circuitry of claim 18, wherein said memory contains instructions executable by said processor whereby the circuitry is further configured to send, for each of the at least two wireless communication devices, a corresponding request to a database holding per-device thresholds and receive a response including the respective threshold.

26. The circuitry of claim 18, wherein said memory contains instructions executable by said processor whereby the circuitry is configured to determine, for each of the at least two wireless communication devices, whether the radio-based medium is accessible or free for transmission to the evaluated wireless communication device.

27. The circuitry of claim 18, wherein said memory contains instructions executable by said processor whereby the circuitry is further configured to allocate access to the radio-based medium for transmission to a selected one of the evaluated wireless communication devices.

28. The circuitry of claim 18, wherein the circuitry is comprised in or comprises a network node, and wherein the network node is a scheduling node, an access point or a radio base station.

29. Circuitry associated with at least two wireless communication devices, wherein the circuitry is configured to allocate access to a radio-based medium, the circuitry comprising:

a processor and a memory, said memory containing instructions executable by said processor whereby said circuitry is configured to:

sense the radio-based medium by estimating a received signal level;

evaluate, for each of the at least two wireless communication devices, whether the radio-based medium is accessible or free for transmission based on comparing the received signal level to a respective threshold associated with the evaluated wireless communication device; and allocate access to the radio-based medium for a selected one of the evaluated wireless communication devices at a time based on the evaluation, for each of the at least two wireless communication devices, of whether the radio-based medium is accessible or free for transmission, wherein the circuitry is configured to allocate access by allocating access to the radio-based medium for the selected one of the evaluated wireless communication devices, for which the radio-based medium has been determined to be accessible or free for transmission.

30. The circuitry of claim 29, wherein each of the at least two wireless communication devices is associated with a respective individual threshold for determining whether the radio-based medium is accessible or free for transmission.

31. The circuitry of claim 29, wherein each of the respective thresholds is a per-device threshold that is based on device-specific information.

32. The circuitry of claim 29, wherein said memory contains instructions executable by said processor whereby the circuitry is configured to perform radio-based medium access based on a Listen-Before-Talk (LBT) medium access procedure, and configured to perform scheduling or access allocation based on radio-based medium or channel sensing with individual ones of clear channel assessment thresholds (CCATs) for each of the at least two wireless communication devices.

33. The circuitry of claim 29, wherein said memory contains instructions executable by said processor whereby the circuitry is configured to operate in connection with a database maintaining an individual clear channel assessment threshold (CCAT) for each associated wireless communication device, a so-called per-device CCAT.

34. The circuitry of claim 33, wherein said memory contains instructions executable by said processor whereby the circuitry is further configured to retrieve, for each of the at least two wireless communication devices, the per-device CCAT from the database to effectuate CCAT configuration for the evaluated wireless communication device.

35. The circuitry of claim 33, wherein said memory contains instructions executable by said processor whereby the circuitry is further configured to determine or adjust the individual CCAT per-device based on device-specific information.

36. The circuitry of claim 29, wherein said memory contains instructions executable by said processor whereby the circuitry is further configured to send, for each of the at least two wireless communication devices, a corresponding request to a database holding per-device thresholds and receive a response including the respective threshold.

37. The circuitry of claim 29, wherein said memory contains instructions executable by said processor whereby the circuitry is further configured to evaluate, for each of the at least two wireless communication devices, whether the radio-based medium is accessible or free for transmission to the evaluated wireless communication device.

38. The circuitry of claim 29, wherein the circuitry is comprised in or comprises a network node, and wherein the network node is a scheduling node, an access point or a radio base station.

39. A computer program product stored on a non-transitory, computer readable medium and comprising program instructions, which when executed by at least one processor, cause the at least one processor to:
   read information representative of an estimated received signal level obtained from sensing a radio-based medium;
   evaluate, for each of at least two wireless communication devices, whether the radio-based medium is accessible or free for transmission based on comparing the received signal level to a respective threshold associated with the evaluated wireless communication device; and
   schedule packet transmission over the radio-based medium based on the evaluation, for each of the at least two wireless communication devices, of whether the radio-based medium is accessible or free for transmission,
   wherein the program instructions, which when executed by the at least one processor, cause the at least one processor to schedule the packet transmission for at least one of the evaluated wireless communication devices, for which the radio-based medium is determined to be accessible or free for transmission.

40. A computer program product stored on a non-transitory, computer readable medium and comprising program instructions, which when executed by at least one processor, cause the at least one processor to:
   read information representative of an estimated received signal level obtained from sensing a radio-based medium;
   evaluate, for each of at least two wireless communication devices, whether the radio-based medium is accessible or free for transmission based on comparing the received signal level to a respective threshold associated with the evaluated wireless communication device; and
   allocate access to the radio-based medium for a selected one of the at least two wireless communication devices based on the evaluation, for each of the at least two wireless communication devices, of whether the radio-based medium is accessible or free for transmission,
   wherein the program instructions, which when executed by the at least one processor, cause the at least one processor to allocate access to the radio-based medium for the selected one of the evaluated wireless communication devices, for which the radio-based medium has been determined to be accessible or free for transmission.

41. A network node configured to be associated with at least two wireless communication devices, for scheduling packet transmission over a radio-based medium, wherein the network node comprises:
   a reading circuit for reading information representative of an estimated received signal level obtained from sensing the radio-based medium;
   an evaluation circuit for evaluating, for each of the at least two wireless communication devices, whether the radio-based medium is accessible or free for transmission based on comparing the received signal level to a respective threshold associated with the evaluated wireless communication device; and
   a scheduling circuit for scheduling packet transmission over the radio-based medium based on the evaluation, for each of the at least two wireless communication devices, of whether the radio-based medium is accessible or free for transmission,
   wherein the scheduling circuit schedules the packet transmission for at least one of the evaluated wireless communication devices, for which the radio-based medium is determined to be accessible or free for transmission.

42. A network node configured to be associated with at least two wireless communication devices, for allocating access to a radio-based medium, wherein the network node comprises:
   a reading circuit for reading information representative of an estimated received signal level obtained from sensing the radio-based medium;
   a determining circuit for evaluating, for each of the at least two wireless communication devices, whether the radio-based medium is accessible or free for transmission based on comparing the received signal level to a respective threshold associated with the evaluated wireless communication device; and
   an allocating circuit for allocating access to the radio-based medium for a selected one of the at least two wireless communication devices based on the evaluation, for each of the at least two wireless communication devices, of whether the radio-based medium is accessible or free for transmission
   wherein the allocating circuit allocates the access to the radio-based medium for at least one of the evaluated wireless communication devices, for which the radio-based medium is determined to be accessible or free for transmission.

43. A method, performed by a network node associated with at least two wireless communication devices, for allocating access to a radio-based medium, said method comprising:
   sensing the radio-based medium by estimating a received signal level;
   evaluating, for each of the at least two wireless communication devices, whether the radio-based medium is accessible or free for transmission based on comparing the received signal level to a respective threshold associated with the evaluated wireless communication device; and
   allocating access to the radio-based medium for a selected one of the at least two wireless communication devices based on the evaluating, for each of the at least two wireless communication devices, whether the radio-based medium is accessible or free for transmission,
   wherein the network node allocates access to the radio-based medium for the selected one of the at least two wireless communication devices for which the radio-based medium has been determined to be accessible or free for transmission.

44. The method of claim 43, wherein each of the at least two wireless communication devices is associated with a respective individual threshold for determining whether the radio-based medium is accessible or free for transmission.

45. The method of claim 43, wherein each of the respective thresholds is a per-device threshold that is based on device-specific information.

46. The method of claim 43, wherein the radio-based medium is determined to be free for transmission if the received signal level does not exceed the respective threshold.

47. The method of claim 43, wherein each of the respective thresholds is a clear channel assessment threshold value.

48. The method of claim 43, wherein the network node schedules packet transmission for the selected one of the at least two wireless communication devices for which the medium is determined to be accessible for transmission.

49. The method of claim 43, wherein the radio-based medium is sensed during a sensing period, and access is allowed for a selected one of the at least two wireless communication devices during a transmission period following the sensing period.

50. The method of claim 43, wherein access to the radio-based medium is based on a Listen-Before-Talk (LBT) medium access procedure, and the access allocation is performed based on radio-based medium or channel sensing with individual ones of clear channel assessment thresholds (CCATs) for each of the at least two wireless communication devices.

51. The method of claim 50, wherein the network node provides an individual clear channel assessment threshold (CCAT) for each associated wireless communication device, a so-called per-device CCAT.

52. The method of claim 51, wherein the network node retrieves, for each of the at least two wireless communication devices, the per-device CCAT from a database to effectuate CCAT configuration for the evaluated wireless communication device.

53. The method of claim 51, wherein the individual CCAT per-device is determined or adjusted based on device-specific information.

54. The method of claim 43, wherein the network node is a scheduling node, an access point or a radio base station.

55. The method of claim 43, wherein the method is performed in a Wireless Local Area Network (WLAN) and/or a cellular communication network.

56. The method of claim 43, wherein the method is performed for downlink communication.

57. The method of claim 43, wherein the network node retrieves, for each of the wireless communication devices, the respective threshold by sending a request including information representing an identity of the wireless communication device to a database holding per-device thresholds and receiving a response including the corresponding threshold.

58. The method of claim 43, wherein the evaluating is performed to determine, for each of the at least two wireless communication devices, whether the radio-based medium is accessible or free for transmission to the evaluated wireless communication device.

59. The method of claim 43, wherein access to the radio-based medium is allocated for packet transmission to a selected one of the at least two wireless communication devices based on the evaluating, for each of the at least two wireless communication devices, whether the radio-based medium is accessible or free for transmission.

* * * * *

UNITED STATES PATENT AND TRADEMARK OFFICE
CERTIFICATE OF CORRECTION

PATENT NO. : 9,730,239 B2
APPLICATION NO. : 14/432551
DATED : August 8, 2017
INVENTOR(S) : Söder et al.

It is certified that error appears in the above-identified patent and that said Letters Patent is hereby corrected as shown below:

In the Drawings

In Fig. 3, Sheet 3 of 10, for Tag "10-1", in Line 1, delete "STA A" and insert -- STA 1 --, therefor.

In Fig. 3, Sheet 3 of 10, for Tag "10-2", in Line 1, delete "STA B" and insert -- STA 2 --, therefor.

In the Specification

In Column 1, Line 27, delete "radio based" and insert -- radio-based --, therefor.

In Column 10, Line 5, delete "CCA" and insert -- CCAT --, therefor.

In Column 10, Line 6, delete "CCA" and insert -- CCAT --, therefor.

In Column 13, Line 54, delete "CSMA-CA" and insert -- CSMA/CA --, therefor.

In the Claims

In Column 20, Line 51, in Claim 18, delete "Circuitry" and insert -- A circuitry --, therefor.

In Column 20, Line 54, in Claim 18, delete "circuity" and insert -- circuitry --, therefor.

In Column 21, Line 64, in Claim 29, delete "Circuitry" and insert -- A circuitry --, therefor.

In Column 24, Line 32, in Claim 42, delete "transmission" and insert -- transmission, --, therefor.

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*